United States Patent
John Wilson et al.

(10) Patent No.: US 11,811,477 B2
(45) Date of Patent: *Nov. 7, 2023

(54) QUASI CO-LOCATION ASSUMPTIONS FOR APERIODIC CHANNEL STATE INFORMATION REFERENCE SIGNAL TRIGGERS

(71) Applicant: QUALCOMM Incorporated, San Diego, CA (US)

(72) Inventors: Makesh Pravin John Wilson, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/643,914

(22) Filed: Dec. 13, 2021

(65) Prior Publication Data

US 2022/0103219 A1    Mar. 31, 2022

Related U.S. Application Data

(62) Division of application No. 16/253,642, filed on Jan. 22, 2019, now Pat. No. 11,239,893.

(Continued)

(51) Int. Cl.
*H04B 7/06* (2006.01)
*H04L 5/00* (2006.01)
(Continued)

(52) U.S. Cl.
CPC .......... *H04B 7/0626* (2013.01); *H04B 7/024* (2013.01); *H04L 5/0048* (2013.01);
(Continued)

(58) Field of Classification Search
CPC .... H04B 7/0626; H04B 7/024; H04B 17/373; H04L 5/0048; H04L 5/0051;
(Continued)

(56) References Cited

U.S. PATENT DOCUMENTS

2014/0314000 A1* 10/2014 Liu ................... H04L 5/0035
370/329
2016/0227519 A1    8/2016 Nimbalker et al.
(Continued)

FOREIGN PATENT DOCUMENTS

| CN | 105308889 A | 2/2016 |
|---|---|---|
| WO | 2016122852 A1 | 8/2016 |
| WO | 2017196398 A1 | 11/2017 |

OTHER PUBLICATIONS

"3rd Generation Partnership Project; Technical Specification Group Radio Access Network; NR; Physical Layer Procedures for Data (Release 15)", 3GPP Draft; RP-172416 38214-200, 3rd Generation Partnership Project (3GPP), Mobile Competence Centre, 650, Route Des Lucioles; F-06921 Sophia-Antipolis Cedex, France, 3GPP TS 38.214 V2.0.0, Dec. 17, 2017 (Dec. 17, 2017), pp. 1-71, XP051365107.

(Continued)

*Primary Examiner* — Redentor Pasia
(74) *Attorney, Agent, or Firm* — Patterson + Sheridan, L.L.P.

(57) ABSTRACT

Certain aspects of the present disclosure relate to quasi co-location assumptions for aperiodic channel state information (CSI) reference signals (RS) in communications systems operating according to NR techniques. An exemplary method that may be performed by a UE includes determining a quasi-co-location (QCL) relationship of an aperiodic channel state information (CSI) reference signal (CSI-RS) to a physical channel and processing the aperiodic CSI-RS according to the determined QCL relationship.

16 Claims, 12 Drawing Sheets

Related U.S. Application Data

(60) Provisional application No. 62/621,536, filed on Jan. 24, 2018.

(51) Int. Cl.
  *H04L 25/02* (2006.01)
  *H04B 7/024* (2017.01)
  *H04W 72/0446* (2023.01)
  *H04W 72/044* (2023.01)
  *H04W 72/23* (2023.01)

(52) U.S. Cl.
  CPC ........ *H04L 5/0051* (2013.01); *H04L 25/0226* (2013.01); *H04W 72/046* (2013.01); *H04W 72/0446* (2013.01); *H04W 72/23* (2023.01); H04L 5/0023 (2013.01)

(58) Field of Classification Search
  CPC . H04L 5/0023; H04L 5/0053; H04L 25/0226; H04W 72/042; H04W 72/0446; H04W 72/046; H04W 72/14
  See application file for complete search history.

(56) References Cited

U.S. PATENT DOCUMENTS

| | | | |
|---|---|---|---|
| 2017/0064675 A1 | 3/2017 | Kim et al. | |
| 2017/0208568 A1 | 7/2017 | Nam et al. | |
| 2017/0302419 A1* | 10/2017 | Liu | H04L 5/0098 |
| 2018/0206132 A1* | 7/2018 | Guo | H04B 7/0404 |
| 2018/0219606 A1 | 8/2018 | Ng et al. | |
| 2018/0269939 A1 | 9/2018 | Hu et al. | |
| 2018/0287757 A1* | 10/2018 | Onggosanusi | H04W 72/23 |
| 2018/0343653 A1* | 11/2018 | Guo | H04W 72/1273 |
| 2019/0058517 A1 | 2/2019 | Kang et al. | |
| 2019/0058561 A1* | 2/2019 | Ho | H04B 7/088 |
| 2019/0075014 A1* | 3/2019 | Zhou | H04W 74/0833 |
| 2019/0132828 A1 | 5/2019 | Kundargi et al. | |
| 2019/0150123 A1* | 5/2019 | Nogami | H04L 5/0053 370/330 |
| 2019/0150124 A1* | 5/2019 | Nogami | H04L 5/0094 370/330 |
| 2019/0158205 A1* | 5/2019 | Sheng | H04B 7/0626 |
| 2019/0165846 A1 | 5/2019 | Kim et al. | |
| 2019/0165847 A1 | 5/2019 | Kim et al. | |
| 2019/0174466 A1* | 6/2019 | Zhang | H04L 5/0057 |
| 2019/0190582 A1* | 6/2019 | Guo | H04W 72/046 |
| 2019/0229792 A1 | 7/2019 | John Wilson et al. | |
| 2019/0387440 A1 | 12/2019 | Yiu et al. | |
| 2020/0059398 A1 | 2/2020 | Pan et al. | |
| 2020/0213050 A1* | 7/2020 | Chen | H04L 5/005 |
| 2020/0288479 A1 | 9/2020 | Xi et al. | |

OTHER PUBLICATIONS

International Preliminary Report on Patentability—PCT/US2019/014694, The International Bureau of WIPO—Geneva, Switzerland, dated Aug. 6, 2020.

International Search Report and Written Opinion—PCT/US2019/014694—ISA/EPO—dated May 15, 2019.

QUALCOMM: "Beam Management for NR", 3GPP Draft; R1-1800859, 3rd Generation Partnership Project (3GPP), Mobile Competence Centre, 650, Route Des Lucioles; F-06921 Sophia-Antipolis Cedex, France, vol. RAN WG1, No. Vancouver, Canada; Jan. 22, 2017-Jan. 26, 2017, Jan. 13, 2018 (Jan. 13, 2018), 5 Pages, XP051385131, Retrieved from the Internet: URL: http://www.3gpp.org/ftp/tsg_ran/WG1_RL1/TSGR1_AH/NR_AH_1801/Docs/ [retrieved on Jan. 13, 2018], Section 5.

Zte., et al., "Details and Evaluation Results on Beam Indication", 3GPP Draft, 3GPP TSG RAN WG1 Meeting #91, R1-1719538, Details and Evaluation Results on Beam Indication, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017 (Nov. 18, 2017), XP051369352, 11 Pages.

Ericsson: "On Beam Indication, Measurement and Reporting", 3GPP TSG-RAN WG1 #90bis, R1-1718433, On Beam Indication, Measurement and Reporting, 3rd Generation Partnership Project, Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017, Oct. 8, 2017, XP051341615, Oct. 3, 2017, 9 Pages.

Taiwan Search Report—TW108102553—TIPOdated Jun. 9, 2022.

Ericsson: Remaining Details on Beam Management, R1-1800699, 3GPP TSG RAN WG1 Meeting AH 1801, Jan. 13, 2018, Vancouver, Canada, Jan. 22-26, 2018, 7 Pages.

Huawei, et al., "Summary of Remaining Details of SRS Design", 3GPP TSG RAN WG1 Ad Hoc Meeting, R1-1800090, 3rd Generation Partnership Project, Mobile Competence Centre, 650, Route Des Lucioles, F-06921, Sophia-Antipolis Cedex, France, vol. RAN WG1, No. Vancouver, Canada, Jan. 22, 2018-Jan. 26, 2018, Jan. 12, 2018, XP051384453, 12 Pages.

* cited by examiner

QUASI CO-LOCATION ASSUMPTIONS FOR APERIODIC CHANNEL STATE INFORMATION REFERENCE SIGNAL TRIGGERS

CROSS-REFERENCE TO RELATED APPLICATIONS

The present application is a divisional of U.S. Non-Provisional patent application Ser. No. 16/253,642, filed Jan. 22, 2019, which claims benefit of and priority to U.S. Provisional Patent Application No. 62/621,536, filed Jan. 24, 2018, both of which are assigned to the assignee hereof and hereby expressly incorporated by reference herein in their entireties as if fully set forth below and for all applicable purposes.

BACKGROUND

Field of the Disclosure

The present disclosure relates generally to communication systems, and more particularly, to methods and apparatus for determining quasi co-location assumptions for aperiodic channel state information (CSI) reference signals (CSI-RS) in communications systems using beamforming and operating according to new radio (NR) technologies.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission and reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to quasi-co-location assumptions for aperiodic channel state information (CSI) reference signals (RS) in communications systems operating according to new radio (NR) technologies.

Certain aspects provide a method for wireless communication by a user equipment. The method generally includes determining a quasi-co-location (QCL) relationship of an aperiodic channel state information (CSI) reference signal (CSI-RS) to a physical channel and processing the aperiodic CSI-RS according to the determined QCL relationship.

Certain aspects provide a method for wireless communication by a base station. The method generally includes determining a quasi-co-location (QCL) relationship of an aperiodic channel state information (CSI) reference signal (CSI-RS) to a physical channel and transmitting the aperiodic CSI-RS according to the determined QCL relationship.

Certain aspects provide a method for wireless communication by a base station. The method generally includes determining a quasi-co-location (QCL) relationship of an aperiodic sounding reference signal (SRS) to a physical channel and processing the aperiodic SRS according to the determined QCL relationship.

Certain aspects provide a method for wireless communication by a user equipment. The method generally includes determining a quasi-co-location (QCL) relationship of an aperiodic sounding reference signal (SRS) to a physical channel and transmitting the aperiodic SRS according to the determined QCL relationship.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
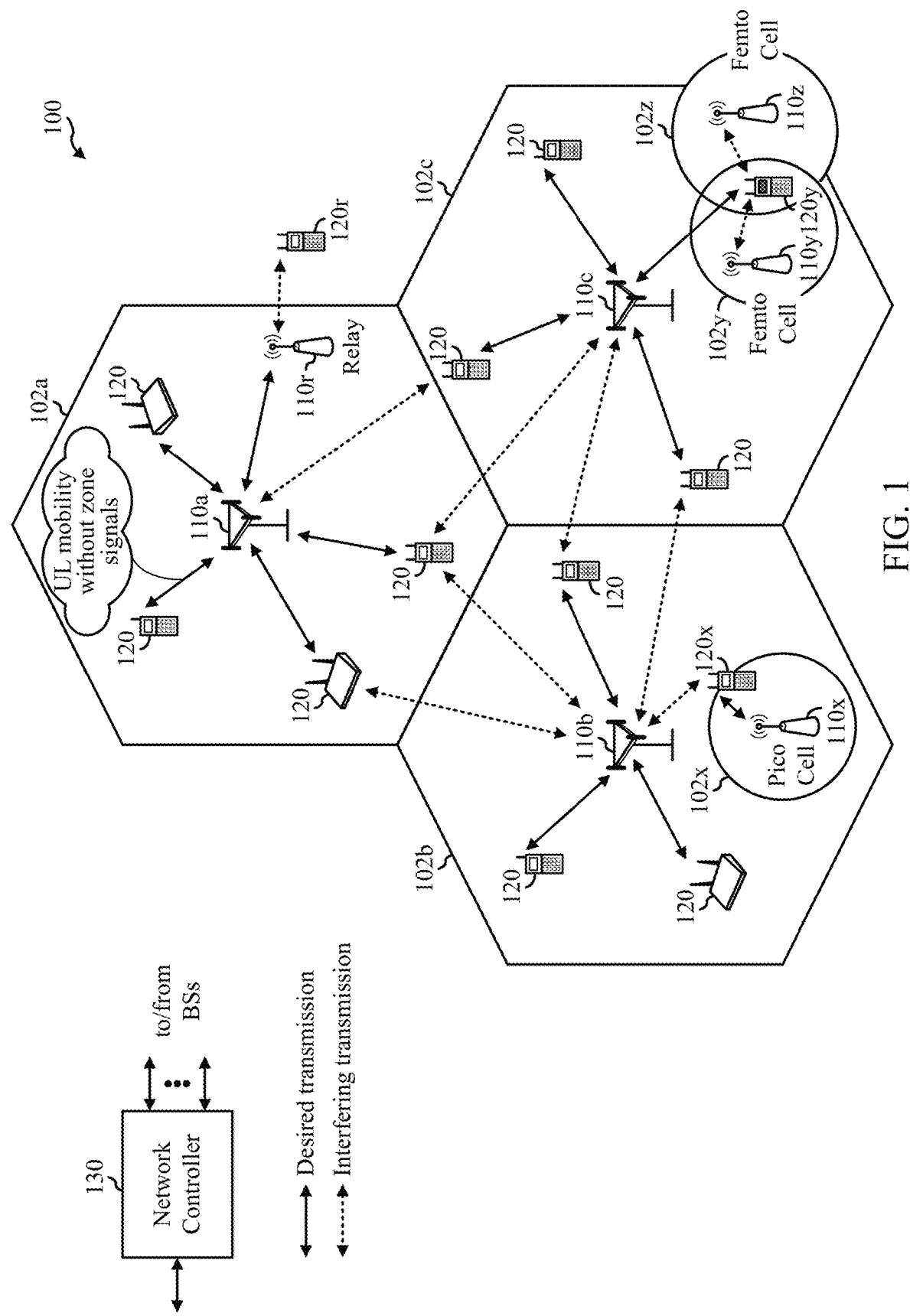
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) services targeting wide bandwidth (e.g., 80 MHz and wider) communications, millimeter wave (mmW) services targeting high carrier frequency (e.g., 27 GHz and higher) communications, massive machine-type communications (mMTC) services targeting non-backward compatible machine-type communications (MTC) techniques, and/or mission critical services targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

Aspects of the present disclosure relate to quasi-co-location assumptions for aperiodic channel state information (CSI) reference signals (RS) in communications systems operating according to NR techniques. According to aspects of the present disclosure, techniques are provided for determining an aperiodic CSI-RS QCL relationship when the aperiodic CSI-RS is frequency division multiplexed (FDM) and/or time division multiplexed (TDM) with a PDSCH (e.g., a downlink data channel).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed, for example, for enabling connectivity sessions and internet protocol (IP) establishment, as described in greater detail below.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, access point, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission and reception point (TRP), or access point) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover (HO), and/or measurement based on the indicated cell type.

Figure 2:
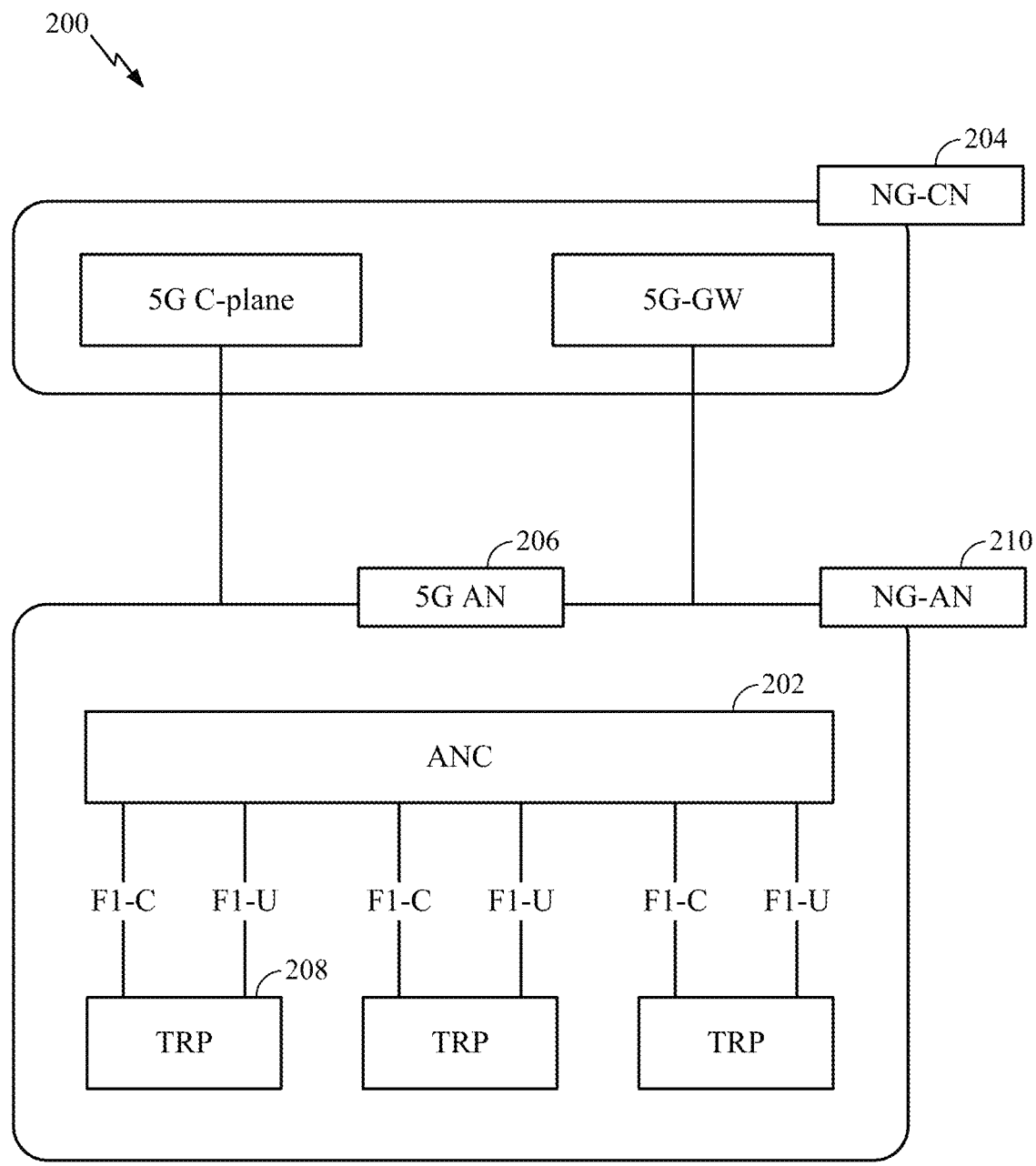
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, NodeBs, 5G NBs, access points, or some other term). As described above, a TRP may be used interchangeably with "cell."

The TRPs 208 may be a DU. The TRPs may be connected to one ANC (e.g., ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The logical architecture of the RAN 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed and/or present.

According to aspects, a dynamic configuration of split logical functions may be present within the logical architecture of the RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
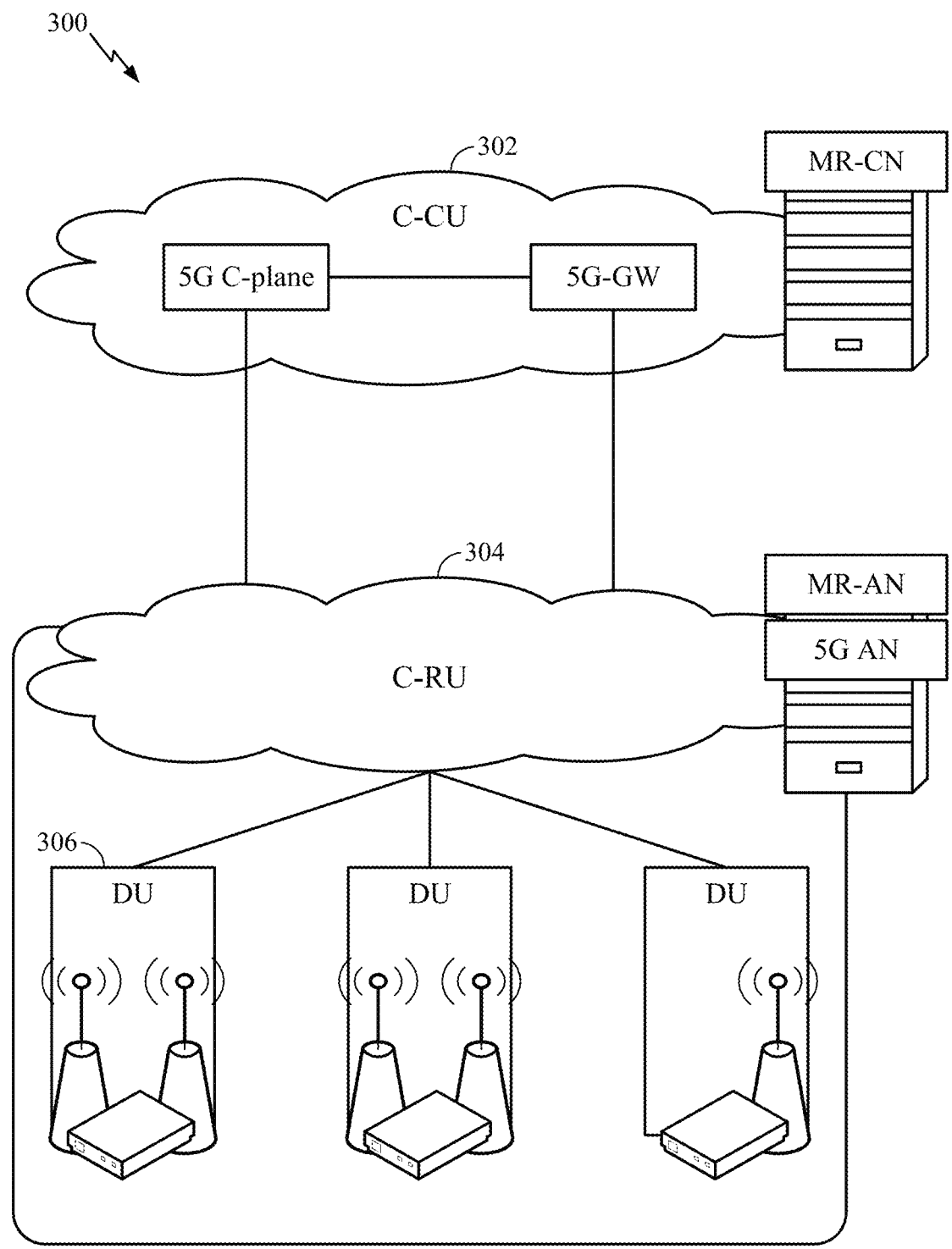
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
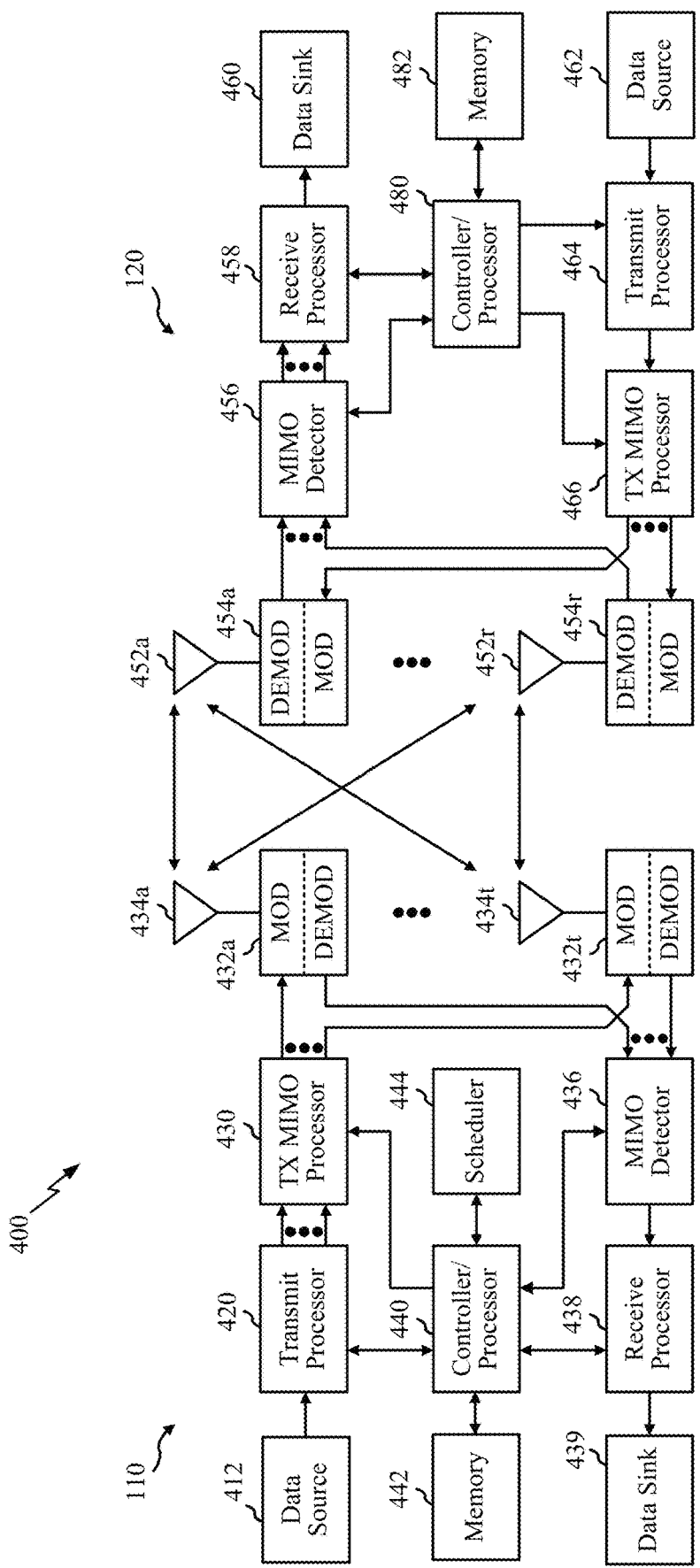
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 440, 420, 438, and/or controller/processor 440 of the BS 110 may be used to perform the operations described herein and illustrated with reference to FIGS. 9-10.

FIG. 4 shows a block diagram of a design of a BS 110 and a UE 120, which may be one of the BSs and one of the UEs in FIG. 1. For a restricted association scenario, the BS 110 may be the macro BS 110*c* in FIG. 1, and the UE 120 may be the UE 120*y*. The BS 110 may also be a base station of some other type. The BS 110 may be equipped with antennas 434*a* through 434*t*, and the UE 120 may be equipped with antennas 452*a* through 452*r*.

At the BS 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) in transceivers 432*a* through 432*t*. For example, the TX MIMO processor 430 may perform certain aspects described herein for RS multiplexing. Each modulator in transceivers 432*a* through 432*t* may process a respective output symbol stream (e.g., for OFDM, etc.) to obtain an output sample stream. Each modulator in transceivers 432*a* through 432*t* may further process (e.g., convert to analog, amplify, filter, and upconvert) the output sample stream to obtain a downlink signal. Downlink signals from modulators in transceivers 432*a* through 432*t* may be transmitted via the antennas 434*a* through 434*t*, respectively.

At the UE 120, the antennas 452*a* through 452*r* may receive the downlink signals from the BS 110 and may provide received signals to demodulators (DEMODs) in transceivers 454*a* through 454*r*, respectively. Each demodulator in transceivers 454*a* through 454*r* may condition (e.g., filter, amplify, downconvert, and digitize) a respective received signal to obtain input samples. Each demodulator in transceivers 454*a* through 454*r* may further process the input samples (e.g., for OFDM, etc.) to obtain received symbols. A MIMO detector 456 may obtain received symbols from all the demodulators in transceivers 454*a* through 454*r*, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators in transceivers 454*a* through 454*r* (e.g., for SC-FDM, etc.), and transmitted to the BS 110. At the BS 110, the uplink signals from the UE 120 may be received by the antennas 434, processed by the modulators in transceivers 432*a* through 432*t*, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The controller/processor 440 and/or other processors and modules at the BS 110 may perform or direct, e.g., the execution of the functional blocks illustrated in FIG. 13, and/or other processes for the techniques described herein. The controller/processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
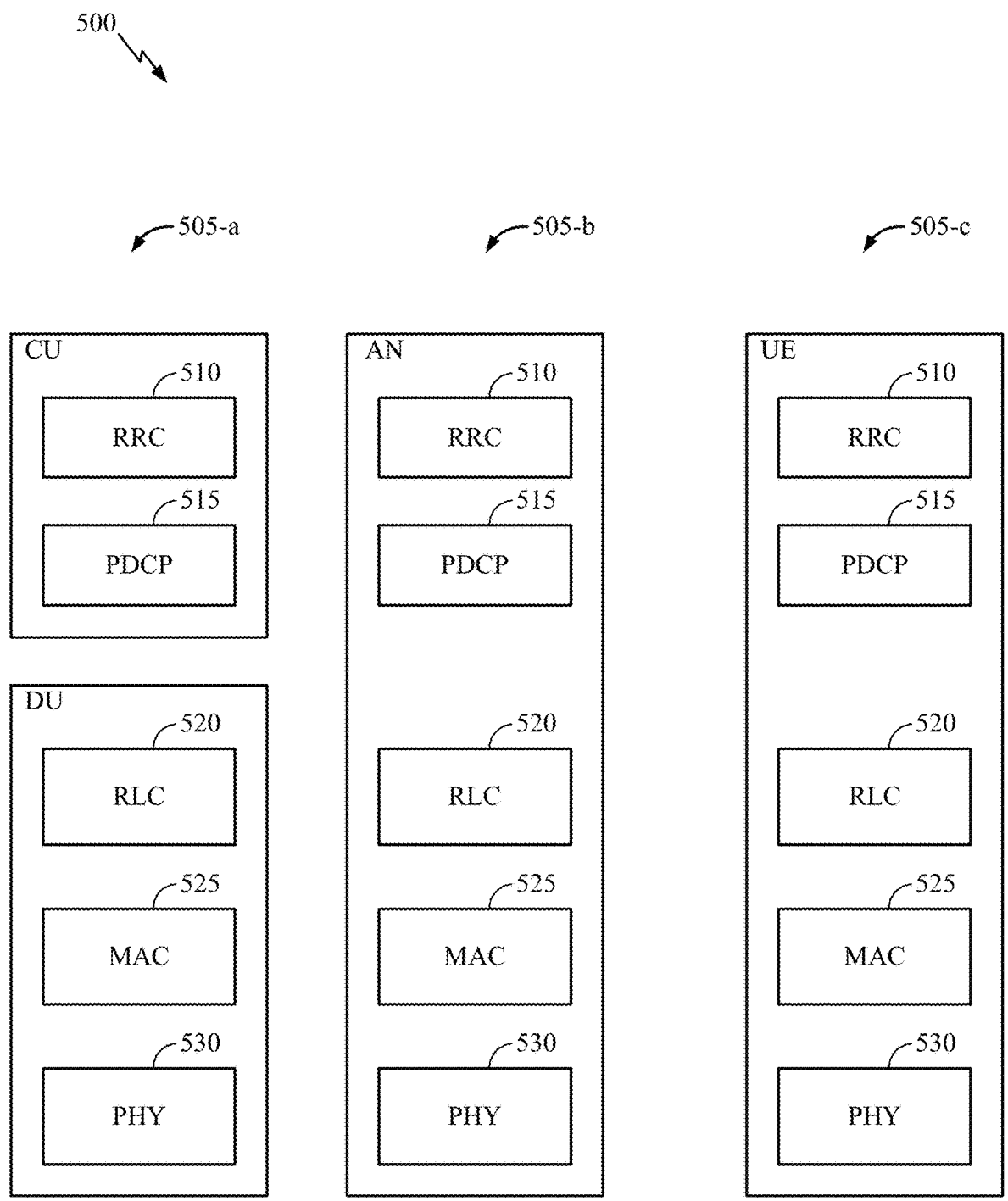
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., a DU and/or TRP 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack 505-c (e.g., the RRC layer 510, the PDCP layer 515, the RLC layer 520, the MAC layer 525, and the PHY layer 530).

Figure 6:
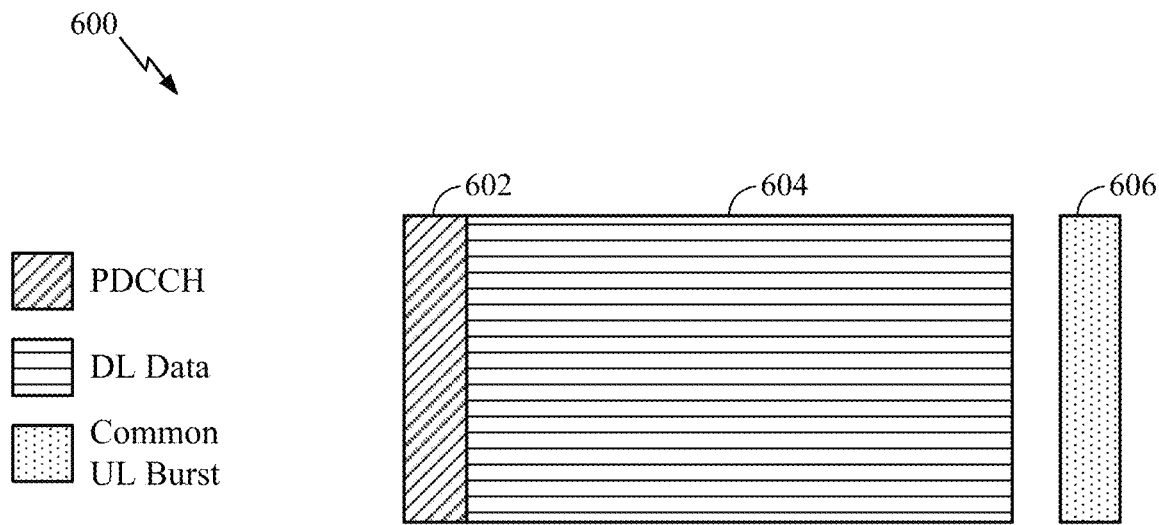
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
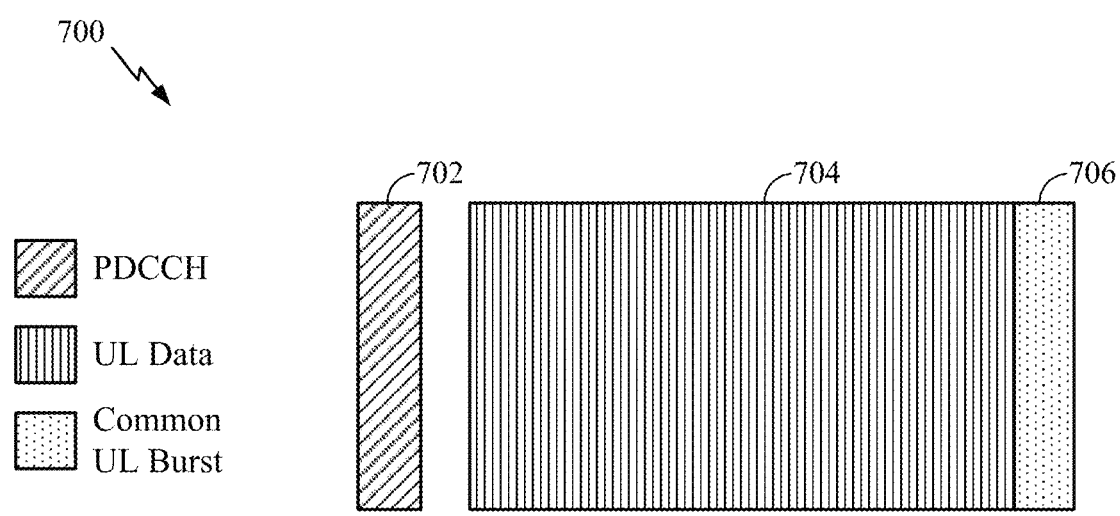
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Figure 8:
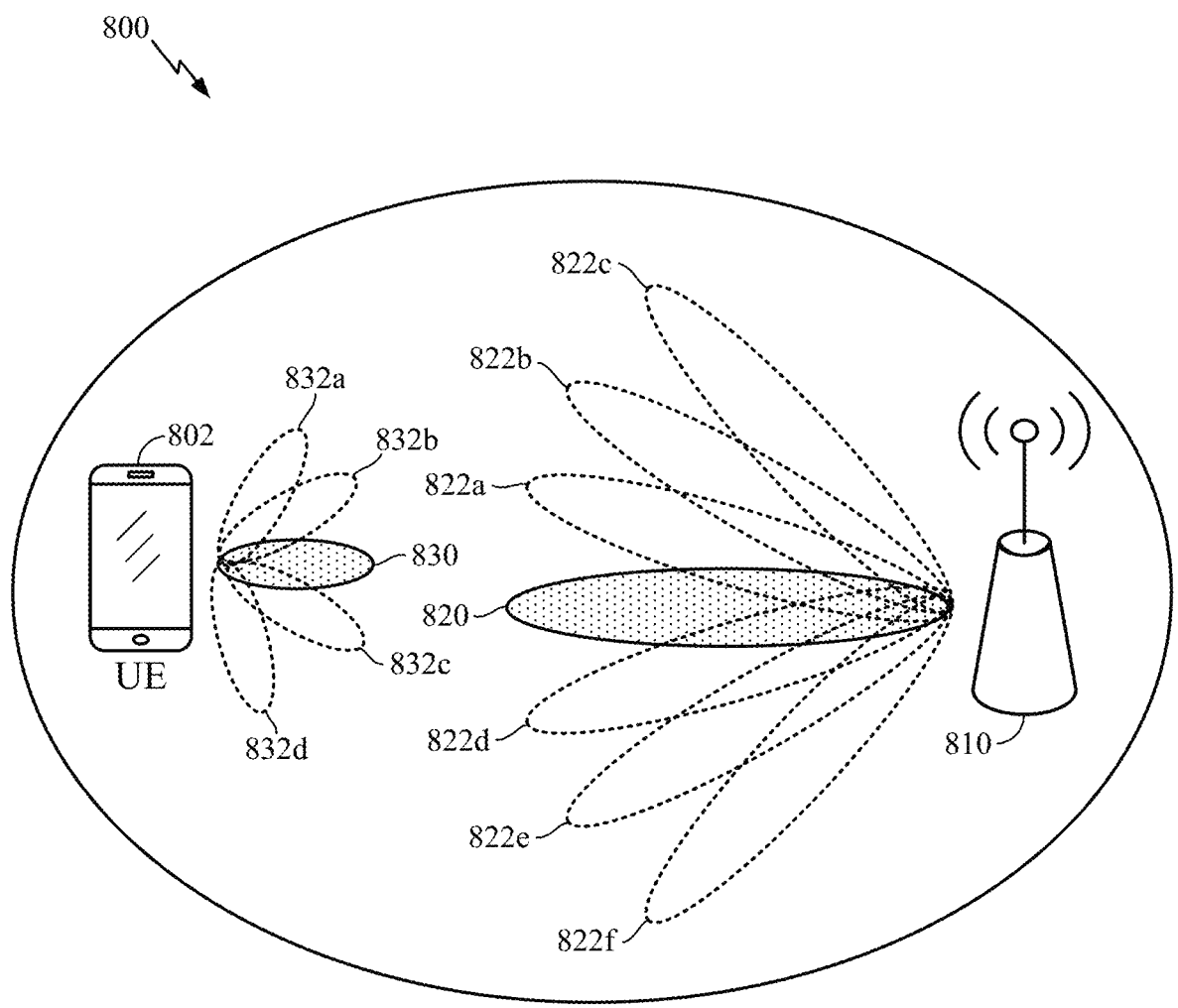
FIG. 8 shows an exemplary wireless communications system, in accordance with certain aspects of the present disclosure.

In NR, a UE may be served by one or more BSs or TRPs using single or multiple beams, as depicted in FIG. 8. FIG. 8 shows an exemplary wireless communications system 800 in which a UE 802 is being served by a TRP 810 using a transmit beam 820. A receive beam 830 of the UE is generally aligned with the transmit beam 820. The TRP (or, for example, a BS) may be capable of communicating via one or more other transmit beams 822a-822f. Similarly, the UE may be capable of communicating via one or more other receive beams 832a-832d. Each transmit beam 820, 822 of the BS may be collocated with a receive beam of the BS. Similarly, each receive beam 830, 832 of the UE may be collocated with a transmit beam of the UE.

Example Quasi Co-Location Assumptions for Aperiodic Channel State Information Reference Signals Multi-Beam operation is a feature of NR wireless communication systems, and some aspects of multi-beam operations have been specified in network communications standards. Among these specified operations are the usage of transmission configuration indication (TCI) states that have been specified to indicate quasi co-location (QCL) states (i.e., states which indicate which antenna ports are used for transmission of reference signals, such as demodulation reference signals (DM-RS) and CSI-RS) for physical downlink shared channel (PDSCH) beams (e.g., transmit beams used by a BS to transmit a PDSCH and receive beams used by a UE to receive the PDSCH).

In aspects of the present disclosure, downlink control information (DCI) can signal the TCI state, and a receiving UE uses the TCI state to derive a QCL relationship for the PDSCH beams. That is, a UE can receive a DCI that includes a grant for a PDSCH and indicates a TCI state, and the UE can determine which REs in the granted resources contain RSs, based on the indicated TCI state.

According to aspects of the present disclosure, a delay may be specified between a downlink (DL) grant of transmission resources (e.g., in a DCI that may be conveyed in a PDCCH) and the corresponding DL data transmission (e.g., a PDSCH transmitted via the granted transmission resources), to allow a receiving UE sufficient time to switch its (receive) beam (e.g., from a receive beam previously used to receive transmissions from the BS).

In previously known techniques, UE behavior during reception of a downlink transmission is not defined when the delay (also referred to herein as an offset parameter) is not determined (i.e., by the UE). A UE may begin reception of a DL transmission when the delay is not determined in certain instances when a DCI schedules the DL transmission to occur shortly after the transmission of the DCI, such that the UE is still decoding a control channel conveying the DCI and a corresponding TCI when the DL transmission starts.

In aspects of the present disclosure, UE behavior when the delay (i.e., the delay between reception of a grant of transmission resources and reception of the corresponding DL transmission) is less than a threshold (e.g., a threshold value, such as a limitation on the UE's ability to quickly switch beams, which may be inherent in the UE) is also specified.

According to aspects of the present disclosure, aperiodic channel state information reference signals (CSI-RS) are also a feature of NR wireless communication systems. Usage of aperiodic (AP) CSI-RS (AP CSI-RS) includes both triggering of the transmission of the aperiodic CSI-RS (e.g., by a BS) and reporting of channel state information (CSI) by a device (e.g., a UE) based on processing the CSI-RS.

In aspects of the present disclosure, techniques are provided for determining an AP CSI-RS QCL relationship when the AP CSI-RS is frequency division multiplexed (FDM) and/or time division multiplexed (TDM) with a PDSCH.

According to aspects of the present disclosure, if a UE is configured with the higher layer parameter TCI-PresentInDCI set as 'Enabled' for the control resource set (CORESET) scheduling a PDSCH (i.e., the CORESET in which a PDCCH scheduling the PDSCH is transmitted), then the UE assumes that the transmission configuration information (TCI) field is present in the DL DCI of a PDCCH transmitted on the CORESET. The UE uses the TCI-States, which may be configured on the UE (e.g., in RRC signaling) according to the value of the transmission configuration indication field in the DCI of the detected PDCCH for determining PDSCH antenna port quasi co-location (i.e., for determining REs containing RSs).

In aspects of the present disclosure, if a UE is configured with TCI-PresentInDCI set as 'Disabled' for the CORESET scheduling the PDSCH (i.e., the CORESET in which the PDCCH scheduling the PDSCH is transmitted), then, to determine PDSCH antenna port quasi co-location, the UE assumes that the TCI state for the PDSCH is identical to the TCI state applied for the CORESET used for the corresponding PDCCH transmission.

According to aspects of the present disclosure, the UE may assume that the antenna ports of one DM-RS port group of a PDSCH transmitted by a serving cell are quasi co-located with the RS(s) in the RS set with respect to the QCL type parameter(s) given by the indicated TCI state, if the offset between the reception of the DL DCI (granting transmission resources for a PDSCH to the UE) and the corresponding PDSCH (i.e., the PDSCH transmitted on the resources granted in the DL DCI) is equal to or greater than a threshold Threshold-Sched-Offset.

In aspects of the present disclosure, for both the case when TCI-PresentInDCI='Enabled' and the case when TCI-PresentInDCI='Disabled', if the offset is less than a threshold (e.g., a threshold value), then the UE may assume that the antenna ports of one DM-RS port group of PDSCH of a serving cell are quasi co-located based on the TCI state used for PDCCH quasi-colocation indication of the lowest CORESET-ID in the latest slot in which one or more CORESETs are configured for the UE. That is, if the offset is less than the threshold, the UE may assume that the QCL relationship of the PDSCH is the same as the QCL relationship of a PDCCH of the CORESET having a lowest identifier (CORESET-ID).

According to aspects of the present disclosure, a PDCCH may convey the offset value, k0, to a UE, but PDCCH decoding takes some time. Thus, it is desirable to specify UE behavior when the offset is not yet known by the UE (e.g., the UE is receiving a PDSCH scheduled by the PDCCH in a same transmission time interval as the UE received the PDCCH).

In aspects of the present disclosure, for the case when TCI-PresentInDCI='Enabled' and the case when TCI-PresentInDCI='Disabled', if the offset is yet to be determined or is less than a threshold, then the UE may assume that the antenna ports of one DM-RS port group of a PDSCH of a serving cell are quasi co-located based on the TCI state used for PDCCH quasi-colocation indication of the lowest CORESET-ID in the latest slot in which one or more CORESETs are configured for the UE. That is, if the offset is yet to be determined or is less than the threshold, the UE may assume that the QCL relationship of the PDSCH is the same as the QCL relationship of a PDCCH of the CORESET having a lowest identifier (CORESET-ID).

It is desirable to specify a QCL relationship for aperiodic CSI-RS for cases similar to those described above with regard to PDSCH. That is, it is desirable to specify an assumption regarding the QCL relationship for aperiodic CSI-RS and another transmission (e.g., a physical channel, such as a PDSCH) that a receiving UE may make for instances when the UE is receiving the other transmission while the UE has not determined the delay (i.e., the delay between reception of a grant of transmission resources for another transmission and reception of the other transmission).

Figure 9:
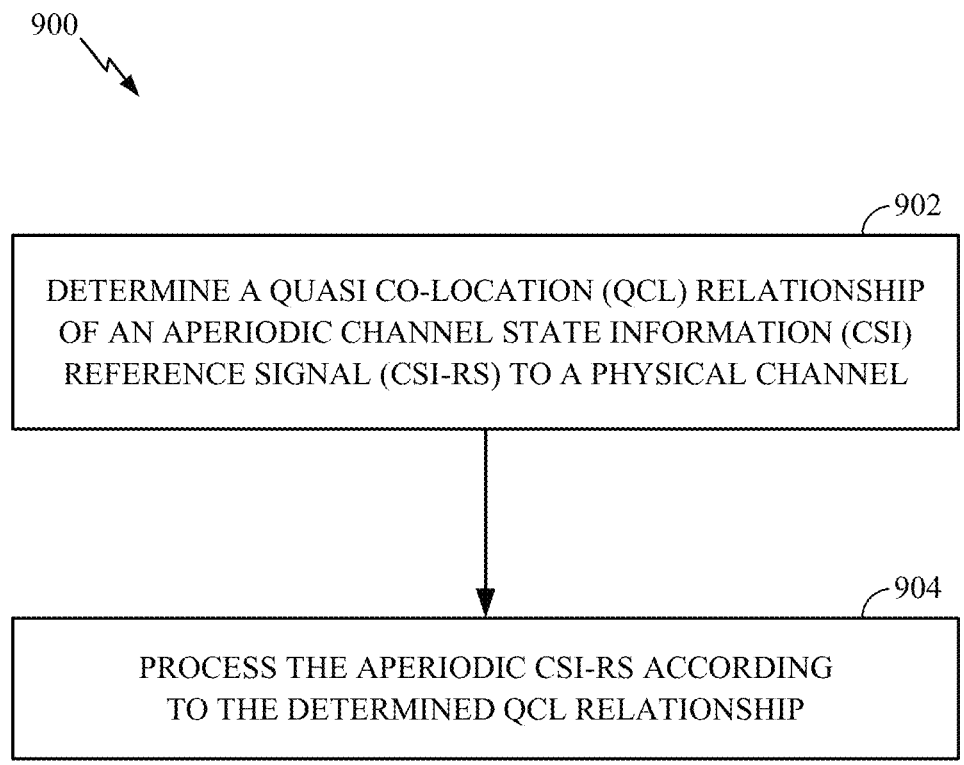
FIG. 9 illustrates example operations for wireless communications, in accordance with aspects of the present disclosure.

FIG. 9 illustrates example operations 900 for wireless communications, in accordance with aspects of the present disclosure. Operations 900 may be performed by a UE, for example, UE 120, shown in FIG. 1 and UE 802, shown in FIG. 8.

Operations 900 begin, at block 902, with the UE determining a quasi-co-location (QCL) relationship of an aperiodic channel state information (CSI) reference signal (CSI-RS) to a physical channel. For example, UE 802 (shown in FIG. 8) may determine a QCL relationship of an aperiodic CSI-RS to a physical channel. In the example, both the aperiodic CSI-RS and the physical channel are transmitted by TRP 810.

At block 904, operations 900 continue with the UE processing the aperiodic CSI-RS according to the determined QCL relationship. Continuing the example, the UE 802 processes the aperiodic CSI-RS (e.g., measures the CSI-RS and determines CSI) according to the QCL relationship determined (by the UE) at block 902.

Figure 10:
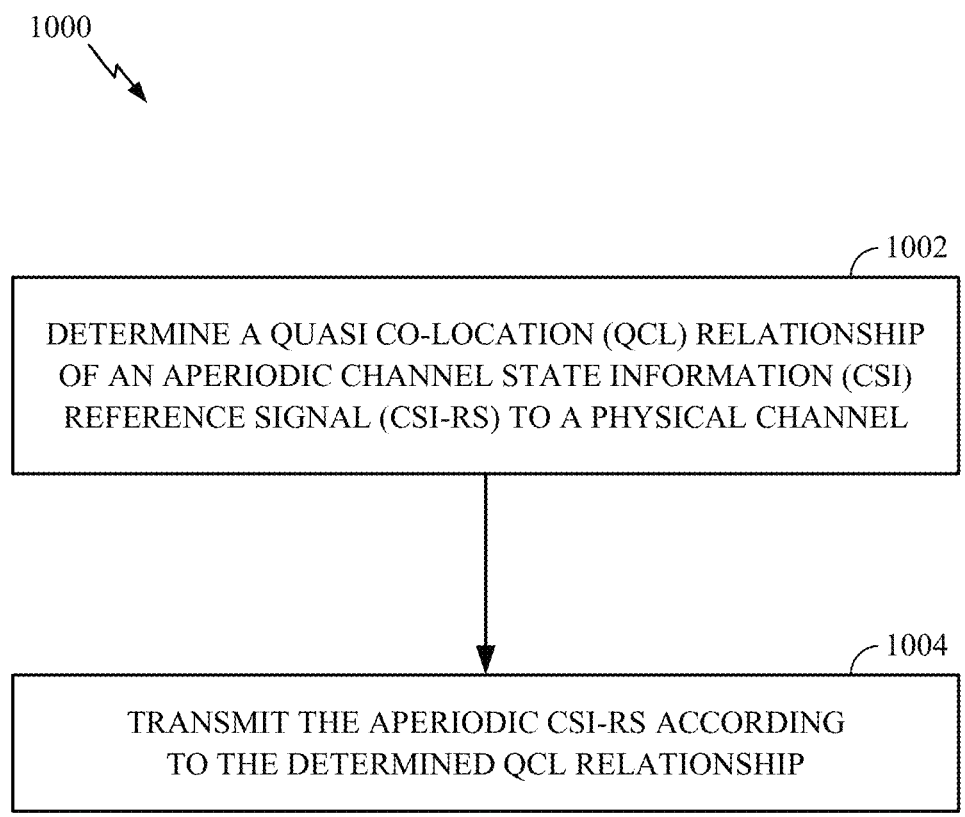
FIG. 10 illustrates example operations for wireless communications, in accordance with certain aspects of the present disclosure.

FIG. 10 illustrates example operations 1000 for wireless communications, in accordance with aspects of the present disclosure. Operations 1000 may be performed by a BS (e.g., a NB), for example, BS 110, shown in FIG. 1, and TRP 810, shown in FIG. 8. Operations 1000 may be complementary to operations 900, described above with reference to FIG. 9.

Operations 1000 begin, at block 1002, with the BS determining a quasi-co-location (QCL) relationship of an aperiodic channel state information (CSI) reference signal (CSI-RS) to a physical channel. For example, TRP 810 (shown in FIG. 8) may determine a QCL relationship of an aperiodic CSI-RS to a physical channel. In the example, both the aperiodic CSI-RS and the physical channel are transmitted by TRP 810.

At block 1004, operations 1000 continue with the BS transmitting the aperiodic CSI-RS according to the determined QCL relationship. Continuing the example, the TRP 810 transmits the aperiodic CSI-RS according to the QCL relationship determined (by the BS) at block 1002.

Figure 11:
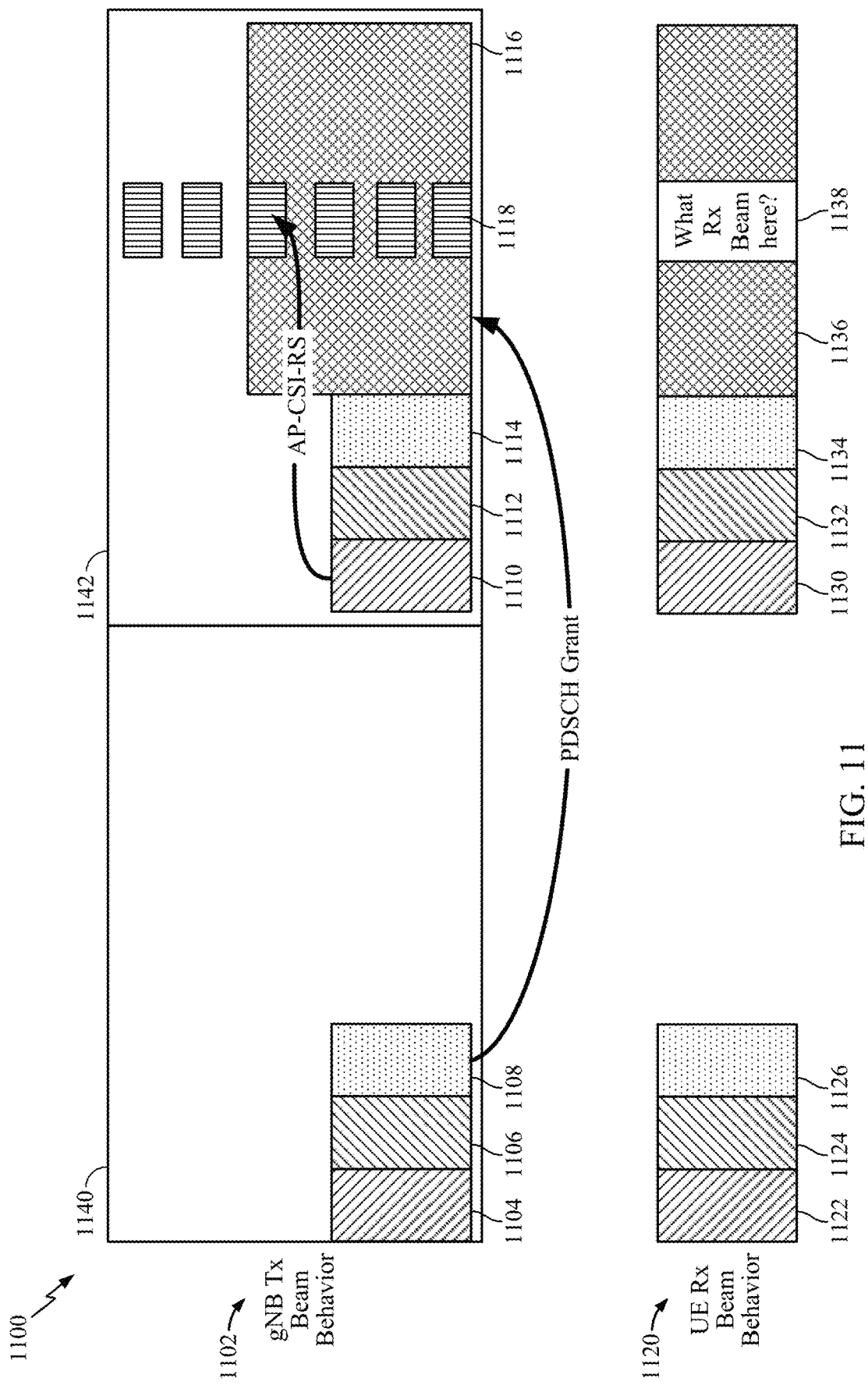
FIG. 11 illustrates an exemplary transmission timeline, in accordance with aspects of the present disclosure.

FIG. 11 illustrates an exemplary transmission timeline 1100, in accordance with aspects of the present disclosure. Transmissions by a BS (e.g., BS 110 shown in FIG. 1 or TRP 810 shown in FIG. 8) are shown at 1102, while receive beam behavior by a UE are shown at 1120. A first slot is illustrated at 1140, while a second slot is shown at 1142. CORESETs 1104, 1106, and 1108 are configured in the first slot, and control channels in each CORESET are transmitted by the BS using a different QCL relationship, as indicated by the different shadings of the CORESETs. Similarly, the UE receives the control channels of each of the CORESETs in the first slot with a corresponding receive beam, at 1122, 1124, and 1126, that uses a same QCL relationship as the BS used when transmitting the control channels on that CORESET. In the exemplary timeline, a control channel (e.g., a PDCCH) transmitted via the CORESET 1108 schedules a PDSCH 1116 for transmission to the UE in the second slot 1142. CORESETs 1110, 1112, and 1114 are configured in the second slot 1142. The UE receives the control channels of each of the CORESETs in the second slot with a corresponding receive beam, at 1130, 1132, and 1134. The UE receives the PDSCH with a receive beam 1136 that matches the QCL relationship that the BS uses when transmitting the PDSCH. The BS also indicates, with a control channel transmitted during the CORESET 1110, that the BS will transmit an aperiodic CSI-RS 1118. The control channel indicates that the aperiodic CSI-RS will be time and frequency division multiplexed with the PDSCH. According to aspects of the present disclosure, the BS may determine a QCL relationship for transmission of the aperiodic CSI-RS, and the UE may determine a QCL relationship for processing of the aperiodic CSI-RS at 1138.

According to aspects of the present disclosure, if an offset (e.g., k0) between an aperiodic CSI-RS and a DL DCI indicating the aperiodic CSI-RS is not yet determined or is less than a threshold (e.g., a minimum time for a UE to switch receive beams), then the aperiodic CSI-RS may be transmitted by a BS and processed by a UE using a QCL of a PDCCH of a CORESET with the lowest identifier (i.e., lowest identifier among all identifiers of CORESETs), CORESET-ID. A system operating according to this principle may encounter difficulties, due to receive beam conflicts at the UE when a PDSCH and an aperiodic CSI-RS are frequency division multiplexed with each other. For example, a PDSCH with an offset that is larger than a threshold may be signaled to use (i.e., be received by a UE via) a first beam with a first QCL relationship, whereas an aperiodic CSI-RS may be triggered by a DCI with an offset smaller than the threshold, indicating a default beam for processing the CSI-RS that is different from the first beam and resulting in the UE being required to receive with the first beam and the default beam simultaneously.

In aspects of the present disclosure, if an offset between a DL control channel conveying a DCI indicating an aperiodic CSI-RS and the aperiodic CSI-RS is not yet determined or is less than a threshold, then the aperiodic CSI-RS in a set of time and/or frequency resources may use a QCL relationship determined based on a previous explicit QCL indication (e.g., an earlier grant for another transmission) in the time and/or frequency resources. That is, if a UE receives a control channel with a DCI indicating an aperiodic CSI-RS will be transmitted on a set of frequency resources and the UE has not determined an offset parameter or the offset parameter is larger than an offset (i.e., a period) between receipt of the DCI and transmission of the aperiodic CSI-RS, then the UE may receive the aperiodic CSI-RS using a QCL indicated in a previous grant for a downlink channel (i.e., another transmission, such as a PDSCH, another aperiodic CSI-RS scheduled with a larger offset, a periodic CSI-RS, or a semi-persistent CSI-RS) on those frequency resources. Or, if there has been no explicit QCL indication, the aperiodic CSI-RS may be received by a UE using the QCL for another transmission (e.g., a unicast PDSCH beam that is frequency and/or time division multiplexed with an aperiodic CSI-RS in the slot or mini-slot.

According to aspects of the present disclosure, an explicit QCL indication may be conveyed in a grant (e.g., a grant for another transmission). For example, the first DCI (transmitted in CORESET 1108) scheduling the PDSCH 1116 shown in FIG. 11 may convey an explicit QCL indication. This explicit indication may indicate a rate-matching bitmap and specify a QCL relationship for resource elements (REs) that are rate-matched around the PDSCH, and the QCL relationship for the rate-matched REs may be different from the QCL relationship for the PDSCH.

In currently known NR techniques, no QCL relationship is specified for the REs that are to be rate-matched around the PDSCH.

According to aspects of the present disclosure, when there is no QCL relationship for rate-matched REs (e.g., REs of an aperiodic CSI-RS rate-matched with a PDSCH) indicated in a grant, then an aperiodic CSI-RS in the rate-matched REs may be transmitted by a BS (and processed by a UE) using the QCL relationship indicated for the transmission with which the REs are rate-matched (e.g., a PDSCH).

In aspects of the present disclosure, when there is a QCL relationship for rate-matched REs indicated in a grant, then an aperiodic CSI-RS in the rate-matched REs may be transmitted by a BS (and processed by a UE) using the QCL relationship indicated in the grant for the rate-matched REs. For example, an aperiodic CSI-RS may be time division multiplexed with a PDSCH, and the CSI-RS may be indicated to use a different beam with a different QCL relationship from the PDSCH. That is, the BS may transmit a physical channel (e.g., a PDSCH) using a first QCL relationship and aperiodic CSI-RS, on REs rate-matched with the physical channel, using a second QCL relationship.

According to aspects of the present disclosure, an uplink transmission (e.g., a physical uplink shared channel (PUSCH)) can be rate-matched around some frequency and time resources whose QCL relationship is indicated in a grant scheduling the uplink transmission. The UE transmitting the uplink transmission can then be triggered to transmit aperiodic sounding reference signals (SRS) on those rate-matched resources, and the UE transmits the aperiodic SRS on the rate-matched resources using the QCL relationship indicated in the grant, which may be different from a QCL indicated for the uplink transmission.

In aspects of the present disclosure, a UE can be triggered to transmit aperiodic SRS in a set of time and frequency resources which the UE has been granted for transmission of an uplink transmission (e.g., a PUSCH). If an offset between a DCI triggering the aperiodic SRS and the aperiodic SRS is less than a threshold, then the UE may use a default configured UL beam (e.g., a beam configured via RRC signaling), or use an UL beam associated with ("an UL beam associated with" means an UL transmit beam derived from a DL beam used to receive the PDCCH) a CORESET having a lowest CORESET-ID.

Figure 12:
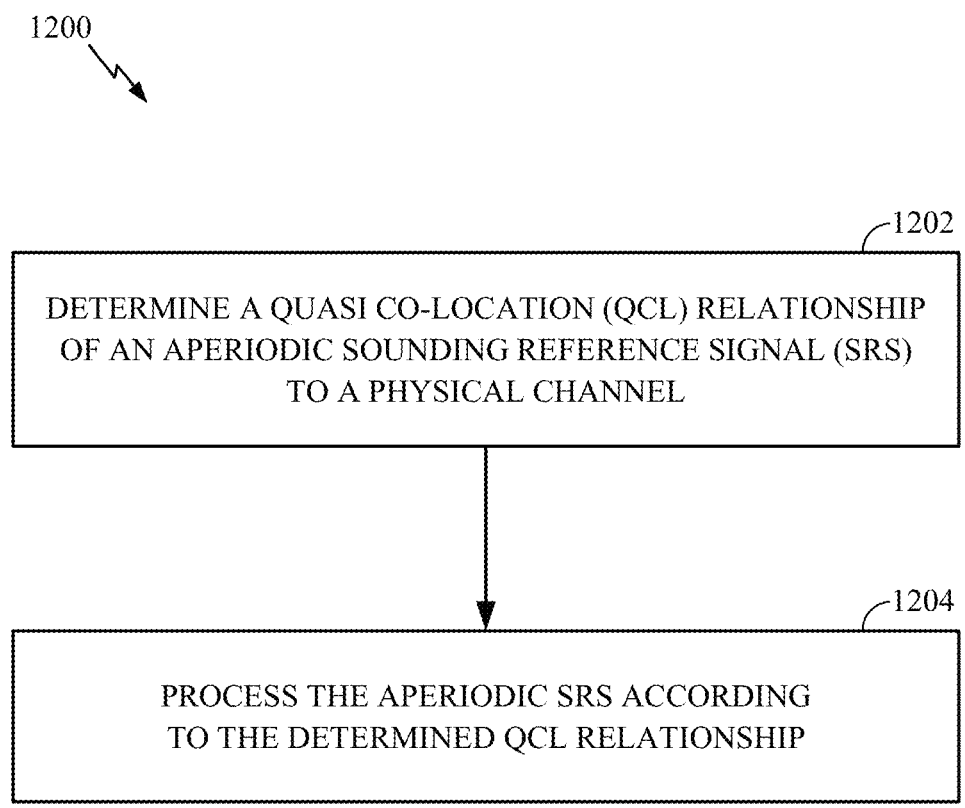
FIG. 12 illustrates example operations for wireless communications, in accordance with aspects of the present disclosure.

FIG. 12 illustrates example operations 1200 for wireless communications, in accordance with aspects of the present disclosure. Operations 1200 may be performed by a BS (e.g., a NB), for example, BS 110, shown in FIG. 1, and TRP 810, shown in FIG. 8.

Operations 1200 begin, at block 1202, with the BS determining a quasi-co-location (QCL) relationship of an aperiodic sounding reference signal (SRS) to a physical channel. For example, TRP 810 (shown in FIG. 8) may determine a QCL relationship of an aperiodic SRS to a physical channel. In the example, the aperiodic SRS is transmitted by UE 802, and the physical channel may be transmitted by UE 802 or by TRP 810.

At block 1204, operations 1200 continue with the BS processing the aperiodic SRS according to the determined QCL relationship. Continuing the example, the TRP 810 processes the aperiodic SRS according to the QCL relationship determined (by the TRP) at block 902.

Figure 13:
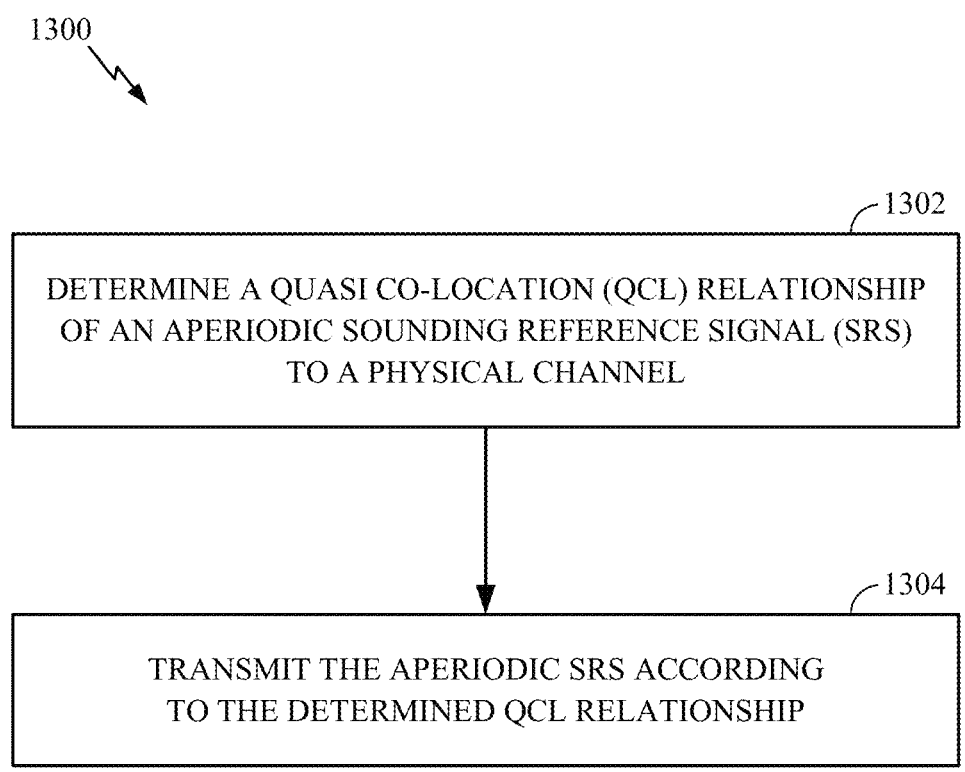
FIG. 13 illustrates example operations for wireless communications, in accordance with certain aspects of the present disclosure.

FIG. 13 illustrates example operations 1300 for wireless communications, in accordance with aspects of the present disclosure. Operations 1300 may be performed by a UE, for example, UE 120, shown in FIG. 1 and UE 802, shown in FIG. 8. Operations 1000 may be complementary to operations 1200, described above with reference to FIG. 12.

Operations 1300 begin, at block 1302, with the UE determining a quasi-co-location (QCL) relationship of an aperiodic sounding reference signal (SRS) to a physical channel. For example, UE 802 (shown in FIG. 8) may determine a QCL relationship of an aperiodic SRS to a physical channel. In the example, the aperiodic SRS is transmitted by the UE 802, and the physical channel may be transmitted by TRP 810 or by UE 802.

At block 1304, operations 1300 continue with the UE transmitting the aperiodic SRS according to the determined QCL relationship. Continuing the example, the UE 802 transmits the aperiodic SRS according to the QCL relationship determined (by the UE) at block 1302.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

For example, means for transmitting, means for processing, and/or means for receiving may comprise one or more of a transmit processor 420, a TX MIMO processor 430, a receive processor 438, or antenna(s) 434 of the BS 110 and/or the transmit processor 464, a TX MIMO processor 466, a receive processor 458, or antenna(s) 452 of the UE 120. Additionally, means for generating, means for multiplexing, means for determining, means for processing, and/ or means for applying may comprise one or more processors, such as the controller/processor 440 of the BS 110 and/or the controller/processor 480 of the UE 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a UE 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, the instructions may include instructions for performing the operations described herein and illustrated in FIGS. 9-10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a base station (BS), comprising:
    determining a quasi-co-location (QCL) relationship of an aperiodic sounding reference signal (SRS) to a physical channel, wherein:
        the determination of the QCL relationship is based on:
            an offset parameter associated with the aperiodic SRS and a downlink control information (DCI) scheduling at least the aperiodic SRS, and
            a threshold value of a time for a user equipment (UE) to switch between beams, and
        determining the QCL relationship of the aperiodic SRS to the physical channel comprises determining to use a QCL relationship of a physical downlink control channel (PDCCH) of a control resource set (CORESET) having a lowest identifier (CORESET-ID), when the offset parameter is lower than the threshold value; and
    processing the aperiodic SRS according to the determined QCL relationship.

2. The method of claim 1, wherein determining the QCL relationship comprises determining to use a QCL relationship of a physical downlink control channel (PDCCH) of control resource set (CORESET) having a lowest identifier (CORESET-ID), when the offset parameter is not yet determined.

3. The method of claim 1, wherein determining the QCL relationship comprises determining to use a QCL relationship indicated in a grant of time and frequency resources of another transmission, wherein the granted time and frequency resources include time and frequency resources of the aperiodic SRS, when the offset parameter is not yet determined.

4. The method of claim 1, wherein determining the QCL relationship comprises determining to use a QCL relationship indicated in a grant of time and frequency resources of another transmission, wherein the granted time and frequency resources include time and frequency resources of the aperiodic SRS, when the offset parameter is lower than the threshold value.

5. A method for wireless communications by a user equipment (UE), comprising:
    determining a quasi-co-location (QCL) relationship of an aperiodic sounding reference signal (SRS) to a physical channel, wherein:
        the determination of the QCL relationship is based on:
            an offset parameter associated with the aperiodic SRS and a downlink control information (DCI) scheduling at least the aperiodic SRS, and
            a threshold value of a time for the UE to switch between beams, and
        determining the QCL relationship of the aperiodic SRS to the physical channel comprises determining to use a QCL relationship of a physical downlink control channel (PDCCH) of a control resource set (CORESET) having a lowest identifier (CORESET-ID), when the offset parameter is lower than the threshold value; and
    transmitting the aperiodic SRS according to the determined QCL relationship.

6. The method of claim 5, wherein determining the QCL relationship comprises determining to use a QCL relationship of a physical downlink control channel (PDCCH) of control resource set (CORESET) having a lowest identifier (CORESET-ID), when the offset parameter is not yet determined by the UE.

7. The method of claim 5, wherein determining the QCL relationship comprises determining to use a QCL relationship indicated in a grant of time and frequency resources of another transmission, wherein the granted time and frequency resources include time and frequency resources of the aperiodic SRS, when the offset parameter is not yet determined by the UE.

8. The method of claim 5, wherein determining the QCL relationship comprises determining to use a QCL relationship indicated in a grant of time and frequency resources of another transmission, wherein the granted time and frequency resources include time and frequency resources of the aperiodic SRS, when the offset parameter is lower than the threshold value.

9. An apparatus for wireless communication, comprising:
    a memory comprising executable instructions; and one or more processors configured to execute the executable instructions and cause the apparatus to:

determine a quasi-co-location (QCL) relationship of an aperiodic sounding reference signal (SRS) to a physical channel, wherein:

the determination of the QCL relationship is based on:

an offset parameter associated with the aperiodic SRS and a downlink control information (DCI) scheduling at least the aperiodic SRS, and a threshold value of a time for a user equipment (UE) to switch between beams, and in order to determine the QCL relationship of the aperiodic SRS to the physical channel, the one or more processors are configured to cause the apparatus to determine to use a QCL relationship of a physical downlink control channel (PDCCH) of a control resource set (CORESET) having a lowest identifier (CORESET-ID), when the offset parameter is lower than the threshold value; and process the aperiodic SRS according to the determined QCL relationship.

10. The apparatus of claim 9, wherein, in order to determine the QCL relationship, the one or more processors are further configured to determine to use a QCL relationship of a physical downlink control channel (PDCCH) of control resource set (CORESET) having a lowest identifier (CORESET-ID), when the offset parameter is not yet determined.

11. The apparatus of claim 9, wherein, in order to determine the QCL relationship, the one or more processors are further configured to determine to use a QCL relationship indicated in a grant of time and frequency resources of another transmission, wherein the granted time and frequency resources include time and frequency resources of the aperiodic SRS, when the offset parameter is not yet determined.

12. The apparatus of claim 9, wherein, in order to determine the QCL relationship, the one or more processors are further configured to determine to use a QCL relationship indicated in a grant of time and frequency resources of another transmission, wherein the granted time and frequency resources include time and frequency resources of the aperiodic SRS, when the offset parameter is lower than the threshold value.

13. An apparatus for wireless communication, comprising:

a memory comprising executable instructions; and one or more processors configured to execute the executable instructions and cause the apparatus to:

determine a quasi-co-location (QCL) relationship of an aperiodic sounding reference signal (SRS) to a physical channel, wherein:

the determination of the QCL relationship is based on:

an offset parameter associated with the aperiodic SRS and a downlink control information (DCI) scheduling at least the aperiodic SRS, and a threshold value of a time for a user equipment (UE) to switch between beams, and in order to determine the QCL relationship of the aperiodic SRS to the physical channel, the one or more processors are configured to cause the apparatus to determine to use a QCL relationship of a physical downlink control channel (PDCCH) of a control resource set (CORESET) having a lowest identifier (CORESET-ID), when the offset parameter is lower than the threshold value; and transmit the aperiodic SRS according to the determined QCL relationship.

14. The apparatus of claim 13, wherein, in order to determine the QCL relationship, the one or more processors are further configured to determine to use a QCL relationship of a physical downlink control channel (PDCCH) of control resource set (CORESET) having a lowest identifier (CORESET-ID), when the offset parameter is not yet determined by the UE.

15. The apparatus of claim 13, wherein, in order to determine the QCL relationship, the one or more processors are further configured to determine to use a QCL relationship indicated in a grant of time and frequency resources of another transmission, wherein the granted time and frequency resources include time and frequency resources of the aperiodic SRS, when the offset parameter is not yet determined by the UE.

16. The apparatus of claim 13, wherein, in order to determine the QCL relationship, the one or more processors are further configured to determine to use a QCL relationship indicated in a grant of time and frequency resources of another transmission, wherein the granted time and frequency resources include time and frequency resources of the aperiodic SRS, when the offset parameter is lower than the threshold value.

* * * * *